April 14, 1964　　　R. B. GALVIN　　　3,128,756
HEATING APPARATUS
Original Filed May 5, 1959　　　2 Sheets-Sheet 1
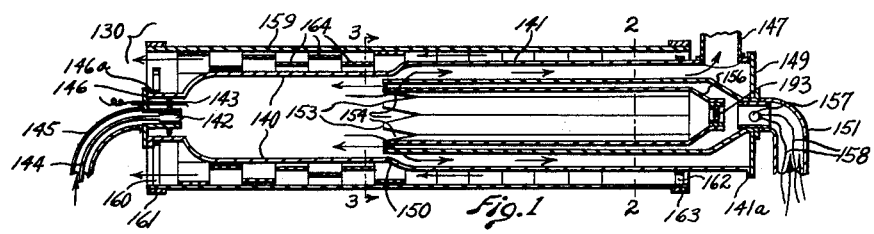
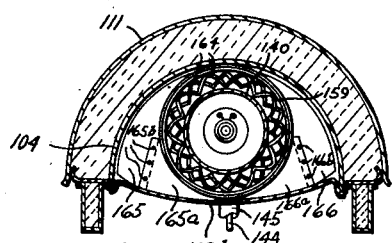
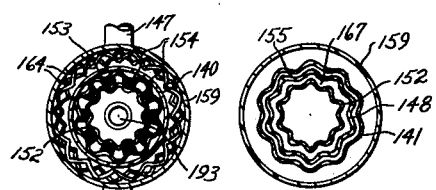
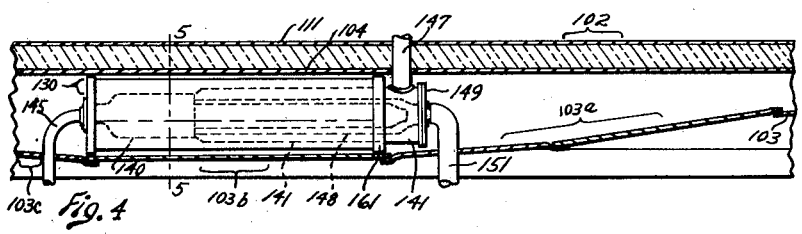
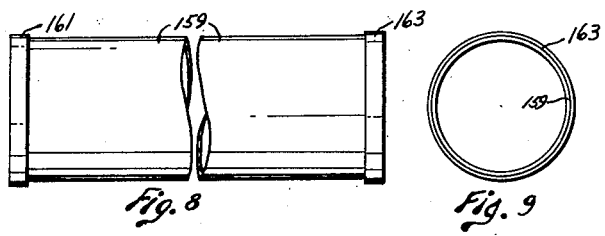
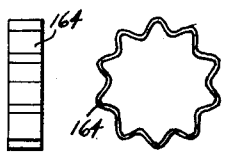 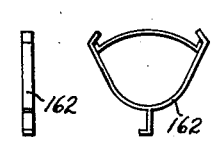 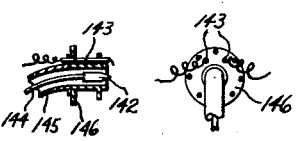
INVENTOR.
RALPH B. GALVIN
BY Mattis and Graybeal
ATTORNEYS

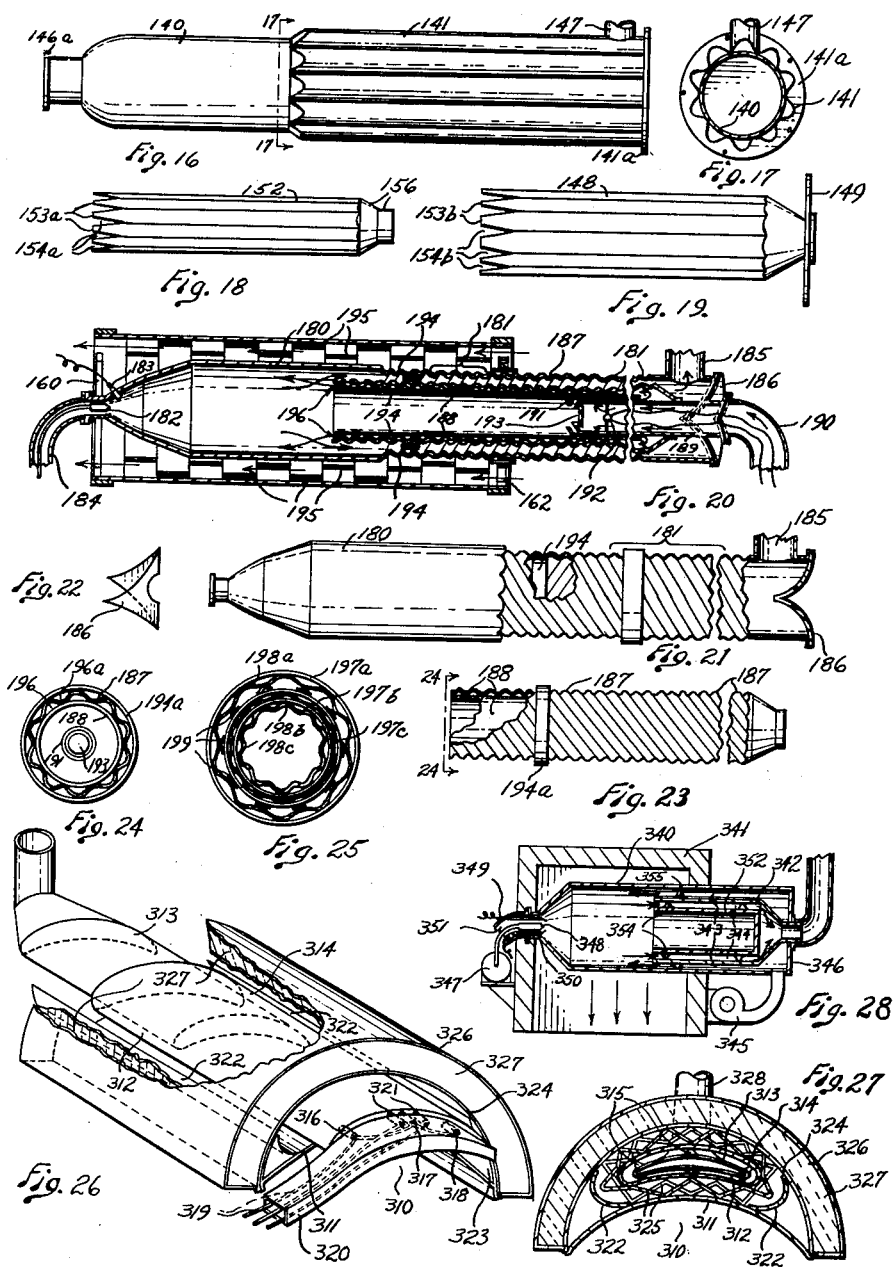

United States Patent Office 3,128,756
Patented Apr. 14, 1964

3,128,756
HEATING APPARATUS
Ralph B. Galvin, 614 S. Dunton Ave.,
Arlington Heights, Ill.
Continuation of application Ser. No. 811,147, May 5, 1959. This application June 27, 1961, Ser. No. 119,901
14 Claims. (Cl. 126—116)

This invention and discovery relates to the art of high temperature heating apparatus and more particularly to a combustion primary heat source characterized by its uniform high temperature combustion chamber and high heat transfer rate of infrared rays or energy through and/or from the combustion chamber wall.

The present invention relates to a heating apparatus characterized by a combustion chamber having a combustion chamber wall and, in one end portion thereof, a fuel spray, and an air discharge member in the opposite end of said chamber directing counterflow air in the form of an envelope along the inside of said combustion wall toward said fuel spray in providing an elongated flame of relatively uniform temperature throughout its length, said air discharge member being located concentrically of and in spaced relation to said combustion wall extended.

The combustion furnace may be used separately, i.e. individually or in combination, for a wide variety of heating and heat-transfer applications. The combustion chamber and preheater may be used as a source of very high intensity infrared heat which may be located under an insulated reflector hood and used as an overhead space heater. The furnace design features are suitable for aircraft heaters, and gas turbine combustion and heat-transfer components. The secondary heat-transfer members of special design can be used advantageously whenever or wherever heat is to be transferred from a high temperature primary surface to a surrounding flowing stream of fluid, transparent or semi-transparent, to infrared rays.

Prior overhead radiant heating systems utilizing electric heat elements are generally objectionable in that they are limited for use in buildings with insulated roof or ceiling construction and are not generally suitable for buildings with large skylight areas and roof ventilation because among other factors, of the high energy cost and shortage of electricity, and lack of dependability and absence of sufficient large plants in isolated areas as in the Arctic.

The furnaces of the invention permit most economic use of heat insulation material because of their compact construction within practical temperature limits of common materials, and are particularly suited for lightly constructed buildings.

Such feature as above described emphasizes the importance of providing a suitable economical heat source for operating at a high temperature. This source should be lightweight for safe overhead support from light building roof structure and of small cross section to permit simple low cost installation within high temperature conduit systems, and should use an economical source of heat energy.

However, most space heating installations require an efficient combustion source of heat energy for best economy. Combustion type heaters suitable for use with high intake temperature circulating heating fluids or as a direct source of high intensity infrared energy require the addition of a combustion air preheater to reduce stack gas temperature and obtain efficient operation. Combustion air preheaters are used to increase efficiency of large central station fuel fired boilers but compact, light weight preheaters, required for efficient operation in the invention, heretofore have not been developed suitable for use with space heaters.

Furthermore, high heat transfer rates are essential for lightweight, compact construction but require high primary source temperatures, particularly so when the circulating heating fluid medium or the heat receiving surface is at an elevated temperature. High primary heat transfer surface temperatures require the use of high temperature corrosive resistant materials which are relatively expansive. Both cost and weight considerations indicate that heat transfer surfaces should be as thin as practical. Thin wall construction for light weight, and high temperature operation for high heat transfer rates and decrease in both size and weight, make it necessary to provide for axially symmetrical temperature distribution and independent expansion of all component parts to prevent warping or stressing due to thermal expansion—it being understood that the temperatures may vary longitudinally and radially. Also, since the heat transfer surfaces are characterized by extreme thinness, there can be no substantial heat transfer by conduction other than at right angles to the plane of their surfaces, making the use of fins or extended surface heat transfer surfaces impractical. Moreover, fin construction, due to differentiated temperatures, induces stresses. Still another requirement of a suitable furnace design for use in conduit heating systems is the limitation of the pressure drop of the circulating heating fluid medium through the furnace in order to keep the number and power requirements of the circulating fans low, particularly because of the necessity for large mass circulation imposed by the condition of small variation of the heating fluid temperature throughout the conduit.

It follows from the above that one of the important problems to be met in the development of a practical heating method is the design of an efficient, high temperature, thin walled, small diameter combustion furnace and air preheater particularly adapted for use with high intake temperature circulating heating fluids having moderate pressure drop through the furnace casing.

The combustion type furnace and heat transfer surface of the invention and discovery as applied within high temperature conduit systems are characterized by a small cross section, and the use of thin, high temperature corrosive resistant material, and the arrangement of a uniformly high temperature radiating combustion chamber wall surrounded by special extensive but compact, convection cooled-radiant heat absorbing, uniform temperature, thin heat transfer surface, and with an extension to the combustion chamber containing a special counterflow concentric thin shell type air preheater discharging its preheated air through a ring of nozzles, disposed between gaps for the stream of outflowing combustion products, into the flue end of the combustion chamber around the opposite flowing flame and products of combustion and against the combustion chamber wall.

Very thin materials are used for the heat transfer surfaces since the heat is transferred directly through the walls at right angles to their surface planes so that no heat transfer by conduction is required in a direction parallel to these surface planes through the wall material, and each component surface is at a uniform temperature around its cross section and is free to expand independently of the others by means of sliding or cradle type supports so that no warping or stresses are caused by differential thermal expansion between these components.

The circulating heating fluid is heated by convection. The amount of heat transferred by convection is a function of the temperature difference, the surface area, the mass flow rate or velocity and the reciprocal of the mean hydraulic radius or the effective cross sectional area of each flowing stream. The temperature difference is limited by the requirement for a high circulating fluid temperature on the one side and the temperature limit of the wall material on the other side. The mass flow rate or velocity is limited by the requirement for moderate pressure drop. An increase in surface area by means of fins or extended surface on the combustion chamber wall or primary surface requires heavy wall construction and thick welds where the fins are attached to the walls for conduction of heat within the walls to the fin tips and introduces temperature gradients within the wall with resultant thermal stressing, and increases weight and cost of materials and fabrication. However, a high rate of radiant heat transfer from the combustion chamber wall forming the primary surface can be obtained within the temperature limit of the wall material if the surrounding surfaces are kept relatively cool. The surrounding or secondary surfaces will then absorb the radiant heat from the primary surface but must transfer this heat by convection to the circulating heating fluid. A cylindrical casing or a simple cylindrical shroud does not present a large enough surface for adequate convection heat transfer within the limitation for practical circulating heating fluid velocities. Indeed, the minimum casing diameter is determined by this maximum velocity and practical pressure drop.

To provide a high rate of heat transfer to the high temperature circulating heating fluid with practical velocity without the use of extended surfaces or fins on the primary surface, the invention provides a very large area and compact secondary heat transfer surface in the form of thin, short members relatively independent of each other and of deep and arched corrugated form which bear only on their outside edges against the casing of the furnace. The corrugations extend radially almost across the space between the casing and the combustion chamber wall or other high temperature primary surface but preferably with sufficient clearance so that their inner edges do not bear on the primary surface, in order to permit free expansion. The heat transfer from the primary surface to the surrounding secondary heat transfer surface is by radiation exclusively. This radiation may be considered as effectively concentrated in a radial direction and is distributed over the deep corrugated surface at approximately uniform intensity. The arched corrugations divide the space between the primary surface and the outer furnace casing through which the circulating heating fluid flows into a plurality of approximately equal channels cross sectionally considered so that the film resistance to convection heat transfer remains practically the same for all channels and the effective hydraulic diameter of the flow paths is reduced for greatly improved convection heat transfer. These secondary heat transfer members are of short length and are staggered in alternate arrangement in order to increase the convection heat transfer rate by more uniform heating of the circulating heating fluid by exposing each stream first to one side and then to the opposite side of alternate members, and by increasing the useful turbulence of the stream by shortening the distance between leading edges. The circulating heating fluid flows through the furnace in a parallel path to the axis of the conduit and furnace with little change in direction and a minimum pressure drop due to loss of velocity head. Indeed, there need be no substantial change in the velocity between that in the conduit of the circulating medium and that in the furnace. Uniform distribution of the radiant heat is obtained from the primary surface in impinging upon the secondary surface. The secondary heat transfer members preferably may be of an arched form and may have a rather sharp oblique angle at their inner edge where the concentration of heat is greater than at the outer edge where a flatter area is exposed to the radial rays from the primary surface. Moreover, the arched form eliminates vibration and noisy operation of these members despite their extremely thin construction. The secondary heat transfer members add reinforcement and stiffness to the casing and shield the casing from direct radiant heat from the primary surface—thus permitting light uninsulated casing construction.

These special secondary heat transfer members provide a new and inexpensive way of fabricating a multiple of parallel effectively small diameter flow paths as well as obtaining a uniform intensity distribution of radiating infrared rays from the primary surface. The invention avoids uneven heat distribution and objectionable concentration of heat transfer. Uniformity of temperature and heat transfer is maintained in the various members with thin wall construction, that is with a minimum of material. Thinness of material, which is a particularly important feature of the invention, improves the heat transfer rate because heat flow is required only at right angles through the material.

At the operating temperature the major portion of heat from the primary surface is transferred by radiation. Since the rate of heat transfer by radiation varies with the 4th power of the absolute temperature whereas the rate of heat transfer by convection varies only directly with the temperature, there is less variation of primary surface temperatures with varying heat transfer rates when the mode of heat transfer is predominately by radiation rather than by convection. Where radiant heat transfer predominates, a combustion chamber wall type of primary surface will come up to temperature faster and will have greater uniformity of temperature despite variations in flame temperature, heat release rates, or heat transfer rates which may occur along the length of the combustion chamber. Flame stability is improved by providing sufficiently hot wall temperatures throughout the length of the furnace and higher average wall temperatures may be obtained without overheating of the highest temperature zones. As materials are developed suitable for higher operating temperatures, the advantage of radiant type primary heat sources, as taught and disclosed by the invention, over convection types will increase.

It is most desirable to have a uniform flame temperature through the length of the combustion chamber to obtain uniform combustion chamber wall temperatures and maximum heat transfer within the temperature limit of the material and to obtain good fuel vaporization and flame stability near the burner tip without the need for costly and bulky refractory elements. In the case of conventional burners where the combustion air is fed into the burner end of the combustion chamber, the quantity and turbulence of relatively cold air available to support combustion is a maximum in the burner end of the combustion chamber and decreases toward the flue end so that the temperature of the flame increases toward the flue end. In order to keep the flame in such conventional furnaces hot enough to support combustion and vaporize the fuel at the burner end, the combustion air may be divided into primary and secondary streams or mixing of the combustion air into the fuel and flame may be otherwise retarded, and refractory material or walls arranged for low heat transfer rates may be used around the burner tip to slow or prevent heat transfer from the flame.

The above mentioned general objects of the invention, together with others inherent in the same, are attained by the mechanism illustrated in the accompanying drawings throughout which like reference numerals indicate like parts:

FIG. 1 is a view in longitudinal vertical section of one form of a heat source or furnace suitable for mounting in the conduits of a high temperature conduit radiant overhead heat mechanism, which furnace maintains the circulating fluid confined in said conduits at a predetermined temperature, particularly illustrating the courses of flow of the combustion air, flue gases and the circulating heating fluid.

FIG. 2 is a view in cross section on dotted line 2—2 of

FIG. 1, particularly illustrating the concentric arrangement of the shells forming the preheater portion of the furnace;

FIG. 3 is a view in cross section on dotted line 3—3 of FIG. 1, through the combustion chamber looking toward the discharge end of the air preheater, particularly illustrating the arrangement of alternating combustion air discharge nozzles and flue gas passage slots, and showing the alternating positions of the secondary heat transfer surfaces;

FIG. 4 is a longitudinal vertical view of the furnace of FIG. 1 mounted in the conduit shown in section, which furnace maintains the circulating fluid confined in said conduit at a predetermined temperature;

FIG. 5 is a view in cross section of FIG. 4 on dotted line 5—5 through the combustion chamber looking toward the burner end of said furnace;

FIG. 6 is a longitudinal view in elevation of the burner end mounting yoke;

FIG. 7 is an end view of said burner end mounting yoke;

FIG. 8 is a fragmentary longitudinal view in elevation of the furnace casing;

FIG. 9 is an end view of said furnace casing;

FIG. 10 is a view in side elevation of a secondary heat transfer member, a plurality of which are employed in coaxial alternate angular positions between the furnace casing and the combustion chamber wall;

FIG. 11 is a view in end elevation of said heat transfer member;

FIG. 12 is a longitudinal view in side elevation of the stack end yoke mounting member;

FIG. 13 is an end view of said stack and yoke mounting member;

FIG. 14 is a view in side elevation of the burner assembly showing the nozzle, ignition electrode, and cooling air jacket for the burner end seal;

FIG. 15 is a view in end elevation of said burner assembly;

FIG. 16 is a longitudinal view in side elevation of the combustion chamber and flue extension of the furnace of FIG. 1;

FIG. 17 is a sectional view on line 17—17 of FIG. 16, with parts in elevation, of the combustion chamber;

FIG. 18 is a detached elevational view of the air preheater inner shell member of the furnace of FIG. 1;

FIG. 19 is a detached elevational view of the air preheater outer shell member of the furnace of FIG. 1;

FIG. 20 is a view of a modified form of furnace in longitudinal vertical section, particularly illustrating the air preheater and flue extension arranged for long spiral flow paths of air and flue gases;

FIG. 21 is a detached view in side elevation of the combustion chamber and flue extension member of the furnace shown in FIG. 20, with a cut away portion showing a centering ring for an air preheater member;

FIG. 22 is a view in perspective of the stack end plate of FIG. 20;

FIG. 23 is a detached view in side elevation of an air preheater member of the furnace shown in FIG. 20 with a cut away portion showing the inner shell;

FIG. 24 is an end view looking in the direction of broken line 24—24 of FIG. 23, showing one arrangement of simply spaced-apart multiple air nozzles.

FIG. 25 is a cross section of still another modified form of preheater and flue extension arrangement, showing the use of shell reinforcing rings with spacers on the middle ring for centering the preheater;

FIG. 26 is a view of yet another modified form of furnace, showing in perspective a non-circular combustion chamber and non-integral flue extension with surrounding flow path for a counterflow feed of a portion of the circulating heated air between the combustion chamber and the flue extension for supporting the combustion of fuel sprayed by multiple fuel nozzles into the combustion chamber in a cut away view of a conduit;

FIG. 27 is a view in cross section of the furnace of FIG. 26 through the combustion chamber looking toward the combustion air inlet surrounding the flue extension showing the arrangement of secondary heat transfer surface members in the circulating heating air stream between the combustion chamber and the conduit wall; and FIG. 28 is a view in longitudinal section of a modified form of a combustion chamber and preheater combination of the invention.

In one embodiment of the invention, as shown in FIGURES 1 to 19, a heat source 130 is located in conduit 102 for heating the fluid medium which is circulated within the conduit to heat the heating element 103 of the conduit. The circulation of said heating fluid passes around the combustion chamber of the furnace or heat source 130 in being heated and is not interrupted and is substantially unidirectional in its circulating path.

The furnace 130 may employ powdered, liquid, or gaseous fuel. In FIG. 1 is shown a combustion chamber shell 140 with integral flue extension portion 141, provided with a burner having a fuel dispenser 142 and ignition electrodes 143 mounted on burner bracket and air seal member 146 (see also FIGS. 14 and 15). Said dispenser 142 has fuel supply conduit 144. A conduit 145 is preferably employed to provide a cooling jacket of forced air for the fuel conduit, and moreover provides for sealing against the nuisance leakage of furnace gases into the circulating heating fluid medium. It has been found with certain standard types of nozzles that such supplementary cooling of the fuel and the nozzle is important for preventing carbonation and plugging of the fuel within the nozzle. The pressure of the said cooling air in conduit 145 exceeds the combustion chamber pressure and thus even nuisance leakage is eliminated. This is important in many applications, for example, in household and hospital applications where odors are particularly objectionable. A stack 147 conducts combustion gases through the conduit 102 to the atmosphere. The flue extension portion 141 is enlarged and corrugated so as to receive or contain the outer shell 148 of the air preheater which is mounted as to one end, in the stack end plate 149 and, as to the other end, is supported by sliding bearing upon the cylindrical wall of the combustion chamber at 150. The efficient operation of the furnace of the invention renders important the disposing of its elements in precise spaced relation so that there is a proper proportion of adjacent combustion air and flue gas streams through the preheater and, more important, a proper proportion of combustion air around the fuel spray and flame. Hence the forward bearing 150 provides for careful centering of the air preheater, and the corrugated form of the flue extension and preheater parts provide rigidity for maintaining the shape of the parts to be held in proper spaced relationship providing equal clearance between and around said parts for symmetrical flow distribution of the furnace combustion air and flue gases. Conduit 151 conducts combustion air through the conduit 102 to the stack end of the air preheater.

An inner shell 152 of the air preheater is concentrically disposed within the outer shell 148 providing passageway or space 167. The burner or discharge end of the air preheater is provided with combustion air passageways or nozzles 153 for the admission of the preheated air to the combustion chamber proper, and said end is also provided with openings or slots 154 for the escape of the burnt combustion gas to the annular space 155 disposed between the outer shell 148 and the flue extension portion 141. In the converging end 156 of the inner shell 152 is a glass window 193 which admits light to the photoelectric cell 157 located on the center axis of the said inner shell 152 in the opening in the stack end plate 149. Electrical conductors 158 connect the said electric cell to a flame failure safety shutdown device of standard construction (not shown).

The cylindrical combustion chamber shell 140 is concentric with cylindrical furnace casing 159 (FIGS. 8 and 9) which is supported at the nozzle end by the burner end yoke 160 (FIGS. 6 and 7) which in turn is retained in position by reinforcing ring 161. At the opposite or stack end of the furnace, the casing 159 is retained in position by stack end yoke 162 (FIGS. 12 and 13) bearing upon said casing 159 and holding the same within reinforcing ring 163. Secondary heat transfer surface members 164, of a corrugated short cylindrical form (see FIGS. 10 and 11) heated by radiation from the combustion shell 140 and cooled by convection by the circulating fluid medium of the conduit 102, are disposed in coaxial, alternate angular positions between the furnace casing 159 and the combustion chamber shell 140. Said heat transfer members 164 are held in place by their circumferential surface bearing upon the furnace casing 159. The design is such that no stress on any of the members occurs and freedom of thermal expansion is fully provided. These heat transfer members 164 preferably do not contact the shell 140 so that each is entirely free to expand independently under the influence of heating. FIGS. 2 and 3 are cross-sectional views on broken lines 2—2 and 3—3 of FIG. 1, showing the shape of the annularly disposed flow paths through the furnace in the preheater and combustion chamber, respectively. FIG. 2 shows the concentric flow path arrangement through the preheater portion. The flue gas passage is defined by extension wall 141 and preheater shell 148. The circulating heating fluid path surrounds the outside of said flue gas passage and is contained within the casing 159. The combustion air path surrounds the inside of siad flue gas passage and is contained within the double preheater shells 152 and 148. FIG. 3 shows a view of the air discharge end of the preheater illustrating the annular arrangement of alternating air nozzles 153 and flue gas slots 154, and showing the staggered positioning of the secondary heat transfer members 164 in the circulating heating fluid stream surrounding the combustion chamber 140. In FIG. 5 are shown two wings or transverse baffles 165 and 166 having detachable segments 165a and 166a for facilitating assembling. Said segments are held by screws 165b and 166b. Said baffles loosely close off the space on each side between the furnace case 159 and upper sheet 104 and lower sheet 103b which is the sheet 103 at the furnace location in the loop modified in its arching to curve downwardly to provide room for the mounting of the furnace 130 therein. Thus, these baffle plates 165 and 166 compel substantially all of the circulating heating fluid to pass between the combustion chamber shell 140 and the furnace casing 159.

In FIG. 4 is a longitudinal sectional view of the conduit 102 showing a view in longitudinal elevation of the furnace 130 located therein. The transition portion 103a of the sheet 103 is shown as it extends or expands to the convex form in becoming the portion 103b beneath the furnace 130 (as shown in cross section in FIG. 5) and then forms the transition portion 103c in passing to the concave form of the conduit.

In FIG. 16 is a separate view in longitudinal side elevation of the combustion chamber 140 and flue extension portion 141.

In FIG. 17 is shown the combustion chamber 140 in cross section and the corrugated flue extension portion 141 in end elevation with its flange 141a.

In FIG. 18 is shown the inner shell 152, preferably corrugated (or otherwise provided with means for stiffness and spacing) with the slots 154a and intermediate formed end members 153a which, when joined with corresponding end members 153b of the outer shell 148, form nozzles 153.

In FIG. 19 is shown the outer shell 148, preferable corrugated (or otherwise provided with means for stiffness and spacing) with the slots 154b, with end members 153b which, when joined with corresponding members 153a, form nozzles 153 and slots 154.

In FIGS. 20–24 is shown a modified form of heat source 130 of the invention in which FIG. 20 is a longitudinal sectional view having a combustion chamber shell 180 of circular form cross-sectionally considered, with integral contracted flue extension portion 181 of preferably spiral and corrugated form. FIG. 21 is a separate longitudinal view of the combustion chamber shell 180 and its flue extension portion 181. Said combustion chamber 180 has a burner with fuel nozzle 182 and starting ignition spark plug 183, and burner end cooling air pressure seal conduit 184. A stack 185 conducts combustion flue gases through the conduit 102 to the atmosphere.

The flue extension portion 181 is contracted on its cross section for more compact and lighter weight construction; said portion 181 is preferably corrugated spirally along its longitudinal axis and receives or contains the outer-shell 187 of the combustion air preheater which is shown correspondingly corrugated and of spiral form.

FIG. 22 is a perspective view of stack end plate 186.

The preheater (FIGS. 20 and 23) has the inner-shell 188 which may also be of spirally corrugated or plain cylindrical form. The object of the corrugated spiral form of the preheater shell 187 is to lengthen the paths of the heat transfer fluids through the preheater elements without increasing the overall length of the furnace.

The heated combustion air is discharged through nozzles or openings 196 with both an axial and a radial velocity component directing this air axially toward the burner and radially against the combustion chamber wall 180. Hence the combustion air circulates against the wall and around the flame despite the air nozzle circle diameter being smaller than the combustion chamber wall diameter.

A radial velocity component may also be obtained with straight axial parallel passageways through the preheater as in FIG. 1 if the axes of the nozzles are disposed at an angle to the furnace axis.

The cylindrical housing 189 contains flame viewing window 193 and photocell 192, and connects with air inlet 190 for the admission of cold combustion forced air around the photocell and back into the air inlet end of the preheater through the passageway formed with the inner shell 188 and mounting means 191, thus forming a closing assembly or member. The photocell 192 operates as a flame failure safety shut down device as it is exposed through window 193 to the flame within combustion chamber 180. Centering ring 194 welded to flue extension 181 is preferably provided to support and center the burner end portion of preheater 186 with corresponding inner ring 194a welded to preheater 187. Secondary heat transfer surface members 195 heated by radiation transfer their heat by convection to the circulating heating fluid medium of the loop 102.

In FIG. 25, another modified form of the flue extension and preheater shell arrangement is shown in cross section to show the use of three stiffening or reinforcing rings (not cross hatched) 197a, 197b, and 197c disposed externally respectively to each of the three shells (cross hatched) 198a, 198b and 198c, and to show the use of spacers or spring clips 199 fastened to the outer preheater shell reinforcing ring 197b for centering the preheater within the flue extension shell 198a. This arrangement provides stiffening of the concentric corrugated shells at their points of support, and permits easy assembly of the preheater shell 198b into the flue extension shell 198a since the spacers 199 may be positioned in the valleys of the extension shell 198a during insertion and then the preheater shell 198b is given a slight twist to position it in proper angular relationship with the extension shell 198a. Outer ring 197a may be supported in any suitable manner within a conduit, such as by yoke 162 (FIG. 13).

In the above described furnace of the invention and discovery as shown in FIGS. 1 to 25, the combustion air is fed around the opposite flowing products of combustion and flame, and against the combustion chamber wall 140 of FIG. 1 or 180 of FIG. 20 so that it gradually mixes or diffuses or is entrained by the products of combustion and flame and fuel particles as it approaches the burner nozzle end of the combustion chamber. Furthermore, the combustion air gradually increases in temperature by contact with the combustion chamber wall and entrained products of combustion as it approaches the burner nozzle end of the combustion chamber. The resultant effect is a decrease in the amount of excess air available to support combustion and an increase in the temperature of this air near the fuel nozzle end of the combustion chamber so that flame temperatures and furnace heat transfer rates through the combustion chamber walls are quite uniform over the length of the combustion chamber permitting high and uniform heat transfer rates over the entire length of the combustion chamber and obtaining good flame stability and preventing soot from forming on the walls and keeping the walls clear of any formation of a relatively cold low velocity film of infrared absorbing combustion gas film. It provides for clean combustion with very little turbulence and low pressure drop through the combustion chamber. It reduces size, weight and cost by eliminating need for refractory and utilizes the entire combustion chamber wall for maximum heat transfer. A portion of the air for combustion travels the full length of the combustion chamber and combines with the fuel on its way back through the center portion of the flame. This proportion is determined by the velocity and shape of the jets by which the combustion air is fed into the combustion chamber, and by the length of the combustion chamber and by the angle of the jet stream from the combustion chamber wall. The amount of entrainment or mixing of products of combustion into the surrounding stream of combustion air is less when the stream of air contacts the combustion chamber wall than it would be if the jet surface were spaced away from the wall. In order to obtain maximum travel with minimum entrainment and low pressure drop, the nozzles 196 of FIG. 24 are pointed at an angle from the furnace axis toward the combustion chamber wall 180, since these nozzles are spaced some distance away from the combustion chamber wall 180 so that the air streams will flow next to the wall surface.

Combustion takes place wherever an atomized fuel particle strikes an air particle since temperatures are adequately high to support combustion throughout the entire furnace. The fuel may be sprayed into the furnace in a conical shape and a portion of the fuel particles will impinge into the combustion air film against the furnace wall and combustion will take place within this air stream. The envelope of air moving counter to the flame will be continuously feeding combustion air on its inner surface to the flame so that the combustion air stream is being introduced in the invention and discovery in a manner which spreads its feeding over an extended length of the combustion chamber 140 of FIG. 1 or 180 of FIG. 20 and it does this in a continuous manner so that there is no sudden injection or mixing of the combustion fuel or air but there is a gradual supplying of heated combustion air for supporting the flame along the entire length of the combustion chamber thus definitely contrasting with the radial jet and other means of introduction of the combustion air into the fuel which result in high turbulence and sudden mixing. The construction of the invention herein set forth contrasts with those burners wherein the combustion air is fed around the flame but in the same direction with the flame and products of combustion. Such burners may have a gradual mixing of the combustion air with the fuel over the length of the flame but have the coldest air and maximum turbulence at the burner end of the combustion chamber which militates against flame stability and uniform flame temperature.

Also the rate of mixing of the combustion air into the fuel and the resultant heat release rate and flame length are sensitive to the relative velocities of the fuel and air streams. This is a disadvantage where the furnace length is fixed by design and variations in velocity may occur due to slight variations in voltage supplying the fan or fuel pump motors, etc., whereas with the furnace of this invention the combustion heat release rate pattern is determined primarily by the shape of the fuel spray. Any combustion air that does not combine with the fuel while it is traveling around the flame and in the opposite direction to the flame travel will mix with the fuel or flame or products of combustion near the center of the combustion chamber as this air travels back out towards the flue end of the furnace. The combustion air in one form of the invention and discovery is fed into the flue end of the combustion chamber in a counter current direction with or without a tangential swirl through multiple nozzles 153 of FIG. 1 and 196 of FIG. 20 arranged in a ring with spaces 154 of FIG. 1 and 196a of FIG. 20 between them for passage of the counter flowing products of combustion of flue gas, the two stremas crossing each other in an interlaced manner. The incoming jets of combustion air and the outgoing streams of products of combustion form interlacing paths between the combustion chamber portion and the flue extension portion which permit a uniform and symmetrical distribution around each of said portions while providing for the crossing of the air jets and gas streams betwen said portions of the furnace. This is a very important feature of the invention and discovery in that it provides for a most efficient transfer of heat from the flue gas extension portion of the furnace to both heat transfer surfaces 141 and 148 of FIG. 1, and 181 and 187 of FIG. 20 and also simplifies design of the preheater. The maintenance of the symmetry of the introduction of the combustion air and the outgoing combustion flue gas provides for the proper distribution of combustion air as well as the proportioning of the air with the fuel spray, flame, and products of combustion. The counterflow envelope of combustion air surrounding the flame and fuel spray provides for an elongated flame of uniform temperature throughout its length and this provides for maximum utilization of the combustion chamber wall for heat transfer in a compact furnace structure.

This interlacing of air and flue gas streams, i.e. passing of one stream through the other, gives us a furnace design providing an air envelope surrounding the flame on the combustion end of the furnace and flue gas envelope surrounding the incoming cold combustion air on the flue end of the furnace without distortion of mixing proportions of air and products of combustion. One the one hand, it is manifest, that is, advantageous, in the combustion chamber to have the combustion air fed in an envelope about the flame. On the other hand it is desirable to make use of the heated flue gas to pass between incoming combustion air and the circulating heating fluid or the heat receiving surface. Such arrangement of passing the exhausting flue gas between the two provides for maximum use and extraction of heat therefrom, since heat is transferred both to the circulating heating fluid or the heat receiving surface on the one side and the cold incoming combustion air on the other. High rate of heat transfer and economical use of material will result in the flue end of the furnace where narrow channels or flow paths, such as 155 for flue gas and 167 for air in FIG. 1, are provided resulting in a small thickness of stream and high velocity which cooperate in providing high heat transfer rates. Economical and light weight construction is further enhanced by adapting the invention to use cylindrical and corrugated forms permitting the use of thin material while retaining necessary rigidity. All of the above features which have been set forth also are combined in providing an open space about the center axis which provides for direct sighting of the flame from the flue end of the furnace where is located a glass window 193 and a photo-electric cell 157 providing safety means for shutting down the furnace on flame failure. The direct discharge of the combustion air through openings or nozzles 153 of FIG. 1 or 196 of FIG. 20 located at the hot end of the preheater eliminates the need for closed heater construction which simplifies construction, reduces cost and provides open end construction permitting the direct sighting of the flame through the center of the perheater to the photocell 157 located on the inlet end. Thus one of the outstanding features of the preheating means is the omission of any closed header on the hot end. The cylindrical and corrugated forms with the corrugations running either parallel to the furnace axis or spirally around it provides a very low cost, light weight, compact and efficient heat transfer arrangement. This shape gives the required rigidity for maintaining uniformity of flow path area cross sectionally considered, which is so important to proper distribution of combustion air and fuel and products of combustion for maintaining symmetrical operation despite the fact that the mechanism will be subjected to high temperature which otherwise might operate to cause distortion of spacing between the three concentric shells forming the flue end of the furnace. This brings out the feature that there are no stresses developed of an objectionable character. The various component parts of the furnace are free to expand independently by the means of independent sliding or cradle type supports.

The furnace and preheater arrangement also eliminates the need for induced draft and unsightly long stacks protruding above the roof level for further reduction in weight, size and cost of the furnace. However, the use of forced draft alone requires the combustion chamber and air preheater to be under positive pressure which may exceed the conduit pressure. Portions of the furnace with products of combustion under pressure exceeding that of the surrounding circulating heating fluid medium must be gas tight with all non-gas-tight joints or connections provided with purge air seals in order to keep products of combustion from entering the heating conduit.

The furnace of the invention and discovery is designed with a single piece combustion chamber and extension for housing the preheater providing gas tight construction from end to end. The small burner connection 146a, in the pressure end is sealed with an air purge through conduit 145 of FIG. 1. The larger preheater flange connection 141a, on the opposite end, is under stack pressure or substantially atmospheric pressure. This construction permits location of the furnace any place along the conduit regardless of the circulating heating fluid pressure without the nuisance leakage of combustion gases into the conduit 102.

In FIGS. 26 and 27 is shown yet another form of combustion type furnace for use as the heat source 130. This furnace differs from those shown in FIGS. 1 and 20 primarily in the deletion of the air preheater and in its cross-sectional shape made to conform closely with that of the crescent-shaped conduit 102. Combustion air is supplied by the circulating heating fluid (which in this case must be air) requiring a constant make up of conduit air, preferably from the entrapped air pocket 310 below conduit lower sheet 311 at the inlet side of a circulating fan (not shown), providing a continuous purge of the entrapped air space 310 as well as the conduit 102. The air available for combustion is at the pressure of the circulating heating fluid which varies over the length of the conduit 102, depending primarily on the distance of the heat source 130 from the circulating fan. Hence the size of the combustion air inlet opening into the combustion chamber must be adjusted to the available pressure.

The combustion air enters the combustion chamber through the opening 312 between the flue extension 313 inside the combustion chamber wall 314. Sliding supports or spacers 315 center the flue extension 313 inside the combustion chamber wall 314. The area of the opening 312 may be reduced by means of baffles (not shown) attached to spacers 315 for limiting the combustion air flow in conduit locations with higher pressure and for adjusting the air pattern to correspond with the fuel spray pattern. As with the combustion furnaces of FIGS. 1 and 20, the combustion air is fed in an envelope surrounding the flame and next to the combustion chamber wall 314, in a counter direction to the fuel spray, flame, and products of combustion, thereby providing uniform flame temperature and high heat transfer rates throughout the length of the combustion chamber 314. Multiple pressure type burner nozzles such as 316, 317, and 318 may be manifolded to fuel supply line 319, or a fish tail type burner (not shown) may be used to provide a thin, wide fuel spray pattern. Nozzle cooling air is provided by conduit 320 and ignition by electrodes 321. Side baffles 322 and end baffles 323 restrict the flow of circulating heating fluid through the corners of the crescent-shaped conduit formed by lower sheet 311 and upper sheet 324. Secondary heat transfer members 325 are located in the circulating heating fluid stream in the annular space surrounding the combustion chamber 314 and within the space defined by upper conduit sheet 324, lower sheet 311, and side baffles 322. The secondary heat transfer members 325 are supported by the conduit walls, upper sheet 324, and lower sheet 311. The sheet 326 forms the cover for insulation 327. The flue extension 313 terminates in stack 328 which extends through the upper sheet 324, insulation 327, and cover sheet 326 for discharging the products of combustion to the atmosphere. No furnace casing is employed, the conduit walls 324 and 311 being substituted therefor. In FIG. 28, a sectional view in elevation is shown of an infrared combustion chamber 340 underneath a high temperature insulated reflector hood 341 with a combustion air preheater 342. This figure illustrates the application of the furnace of a modified form of the invention as a direct source of very high intensity infrared heat without any conduit, circulating heating fluid, or secondary heat-transfer surface. It shows a simplified air preheater construction formed by concentric shells 352 and 353 slidably mounted on supports 354 and 355, said construction being characterized by having the combustion air path 343 and the flue paths 344 interchanged in position from the positions shown in FIGS. 1 and 20, i.e., in this instance the combustion air path 343 surrounds the flue path 344 while the reverse is true in FIGS. 5 and 24. Fan 345 supplies combustion air under pressure to the stack end 346 of the furnace. Fuel pump 347 supplies fuel under pressure to burner nozzle 348. Ignition electrode 349 ignites the fuel. Flame sensing electrode 350 supplies shut down protection in case of flame failure. A segment of conduit 351 is preferably provided leading from fan 345 to provide cooling air to nozzle 348.

In summary, the outstanding features of the heat source construction are; its compact thin wall, lightweight combustion air preheater construction for providing efficient operation, including a relatively high heat transfer from the flue gas, despite the high temperature level of the circulating heating fluid or surrounding media; its single piece, thin wall, small diameter combustion chamber and flue extension shell for gas-tight construction eliminating need for induced draft and providing for simple insertion within the heating conduit; and its arrangement of independently expandable corrugated (or otherwise stiffened and spaced apart) concentric shells providing for shallow and wide flow paths and thin walls for compact lightweight construction, thereby permitting the use of relatively expensive but corrosion-resistant materials.

Relative to the application of the combustion chamber and air preheater of the invention as a direct source of very high intensity infrared heat; the infrared combustion heater of FIG. 28 and the other forms of combustion heaters shown in FIGS. 1 and 20 may be used without a conduit, circulating heating fluid, and secondary heat transfer surface, and may be operated bare for 360° radiation, or under an insulated hood, as in FIG. 28, for downward radiation or provided with reflectors for directional control of infrared heat distribution. These heaters can be operated in any position and can be incorporated as heat source units in many types of heat processing equipment.

The air preheater is particularly important to obtain efficient operation of direct infrared heating combustion furnaces by removing heat from their high temperature flue gases. The flue gases of these furnaces have a high temperature upon leaving the combustion chamber where the heat is generated and from where the useful heat is radiated. The weight and cost of high temperature insulation materials can be reduced by shortening the reflector hood as shown in FIG. 28, covering the radiating surface by allowing the air preheater portion of the furnace to extend outside of the hood. Heat loss by convection transfer from the uninsulated portion of the preheater to the surrounding air can be reduced in this application by having the colder air path surround the flue gas path of the preheater.

The mechanism of the invention involves limitations as to size, particularly for disposition within a conduit suitable for heating, as has been pointed out above. It can not involve very large furnaces because these would not be disposable within a reasonable size conduit, at the same time the furnaces can not be so small that they do not provide for the production of infrared rays of sufficiently high intensity per unit of length without an excessive number of said furnaces.

In selecting a size of mechanism for production of heat by the device of the invention and discovery, not only must the matter of heat capacity be considered but also the question of whether the furnace is one which will meet the most general requirements and at the same time is one which may serve as one of a multiplicity of units of the device to meet larger requirements. For example, a single combustion furnace having combustion means of dimensions hereinafter set forth will provide sufficient heat for 1000 square feet of floor area in a building having a heat loss of the order of 100 B.t.u. per hour per square foot of floor area.

For a mechanism embodying the invention and discovery the following typical proportions for the several components have been found to provide a satisfactory heating mechanism and one which may be used as one member of a multiple device:

(a) *Conduit.*—The conduit formed of a lower sheet of 3 feet in width and an upper sheet of 4 feet in width provides a crescent-shaped member with a central height for the conduit of over ½ foot; such provides for an efficient radiating extended surface and efficient cross-sectional flow area;

(b) *Furnace.*—A furnace burning from 1 to 2 gallons of fuel per hour is in accordance with common practice. Such a furnace may have a combustion chamber of about 1 foot in diameter and 2-3 feet in length so as to provide accommodations for an elongated flame of uniform temperature throughout its length of approximately the same size. The spacing of these furnaces within the conduit is determined by the building heating requirements and the conduit spacing. As one example, a 50-foot furnace spacing will result in a circulating air temperature of the order of 600° F. and a conduit surface temperature of 400° F. for a heat output per foot length of conduit of the order of 2400 B.t.u.'s per hour for heating 1200 square feet of floor area at a rate of 100 B.t.u.'s per hour per square foot.

(c) *Preheater.*—This may vary in length depending upon the economy or efficiency of fuel consumption desired. It has been found a preheater of some 4 feet in length in conjunction with the above described combustion chamber to be reasonably satisfactory with components of the sizes herein disclosed.

(d) *Furnace case.*—It is to be remembered that the conduit is to enclose the heat source or furnace together with the heat transfer means, i.e., the secondary heat transfer surface. It has been found that such furnace casing may be of the order of 1½ feet in diameter.

Let it be noted that a surface type industrial preheater means in common use, which gives comparable results, is several times the length of the preheater disclosed above for the invention herein set forth.

Respecting the control of the heating means embodied in the invention and discovery, as applied to high temperature conduit systems, to reduce the heat when conditions permit, the said invention provides for such reduction in the number of operating furnace units by shutting them off thereby permitting the remainder of the operating furnace units to operate at full capacity, i.e. at their most optimum efficiency. It is to be noted that when throttling furnaces is attempted and they are caused to run at less than their designed capacity, then their efficiency is reduced accordingly. In other words, the units of the device need not be operated at partial capacity; there need be no throttling of the individual heat sources or furnaces of such units.

Since the circulating fluid of the invention is confined in a conduit to provide for efficient heating thereof, there is provided a specially constructed furnace or heating means whereby the circulating fluid will be long exposed to the combustion heat, i.e., it will be in heat communicating relation for an extended length of the furnace. The furnace of the invention provides a furnace of small diameter which permits the furnace to be located within the conduit. A small diameter combustion chamber or flame is characterized by a large ratio of surface area to volume. The surface area varies directly with the diameter whereas the volume varies with the square of the diameter. In this connection there is provided an elongated flame, i.e., a flame of generally small diameter and of a cylindrical form.

In the combustion chamber of the invention a large portion of the heat is transferred directly from the flame surface to the surrounding heat-transfer surfaces. The surface of the flame supplies this heat, and since this surface is large in relation to the volume of the flame especially high heat release rates are provided by the invention. A flame temperature and heat-transfer rate in the furnace of the invention is comparable to those of very much larger furnaces surrounded by relatively cold, water-jacketed heat absorbing surfaces.

By reason of the character of the invention, the furnace must be one of very light weight and at the same time of the utmost efficiency, all of which is best served by thin walls of sheet metal construction with a high heat transfer rate. However, such condition requires the development in the invention of a heat transfer means of high surface temperature.

This application is a continuation of my copending application Serial No. 811,147, filed May 5, 1959, entitled Heating Apparatus, now abandoned, which is in turn a continuation-in-part of my application Serial No. 447,872, filed August 4, 1954, entitled High Temperature Conduit Radiant Overhead Heating, now U.S. Patent No. 2,946,510, issued July 26, 1960.

What is claimed is:

1. A fuel-fired heater mechanism comprising an elongated, combustion chamber defined laterally by a thin-walled heat transfer surface, a fuel burner means situated at one end of said chamber and arranged to deliver a fuel spray in a conical pattern symmetrically of the longitudinal axis of said chamber, and preheater means situated at the end of and away from said combustion chamber opposite from said burner means for delivering preheated combustion air to the flame in said chamber, such combustion air preheater means having spaced apart concentric shells defining between shells an annular pattern of flow paths for the incoming combustion air and also defining between shells an annular pattern of flow paths for the products of combustion discharged from said combustion chamber, and further including means discharging the preheated air as an envelope along the inside of said combustion chamber wall, such envelope being delivered by said preheater means substantially concentrically of said combustion chamber and in counterflow, surrounding relation to said flame so as to be further heated by the flame and so as to mix gradually with and elongate the flame, such air envelope providing efficient fuel combustion and substantially uniform flame temperature throughout the length of the flame while preventing over-heating of any portion of said combustion chamber wall, yet permitting efficient heat transfer from the flame through said combustion chamber wall.

2. A heater mechanism according to claim 1, wherein one of the shells defining the flow paths for the discharged products of combustion is a concentric longitudinal extension of said combustion chamber wall.

3. In combination with the heater mechanism of claim 2, conduit means providing an interspace for channelling a gaseous heat transfer medium past and in direct contact with said combustion chamber wall and chamber wall extension, the arrangement of the said concentric shells in the said preheater means providing that the products of combustion discharged from the combustion chamber yield heat both to the incoming combustion air and to the gaseous heat transfer medium containing interspace between said conduit means and said combustion chamber extension.

4. In a heating mechanism a heat source comprising a combustion chamber having a combustion chamber wall of thin, heat transmitting material, a combustion wall extension arranged coaxially of said combustion chamber wall at one end thereof beyond the combustion zone provided by said combustion chamber and fuel spray means in the end portion of said combustion chamber opposite to the end having said extension; a combustion air preheater disposed in the said combustion wall extension, which extension forms the outer shell of said preheater, said preheater being formed of a plurality of concentric spaced apart shells, the outer shell of which is said combustion wall extension, said shells forming shallow adjacent paths for counterflow combustion air to be heated and flue gases to be discharged after being subjected to heat extraction, said shells having spaced nozzle means defining openings from said air paths into said combustion chamber and projecting the preheated combustion air in an axial direction along the inside surface of the combustion chamber wall as an envelope surrounding and gradually mixing with the flame emerging from said fuel spray means so that such flame is of an elongated form and of relatively uniform temperature, said nozzle means dividing the air paths into multiple spaced apart streams with intermediate slots therebetween through which slots the combustion exhaust gases flow in direct, gaseous heat exchange relationship with the preheated combustion air entering the combustion chamber.

5. In a heating mechanism a heat source comprising an elongated combustion chamber having a combustion chamber wall of thin, heat transmitting material, a combustion wall extension arranged coaxially of said combustion chamber wall at one end thereof, and fuel spray means in the end portion of said combustion chamber opposite to the end having said extension; a combustion air preheater disposed in the said combustion wall extension, which extension forms the outer shell of said preheater, said preheater being formed of a plurality of concentric spaced apart shells, at least one of said shells being of corrugated form and having a reinforcing means providing rigidity and precise concentric arrangement of said shells, said shells forming shallow adjacent passageways for counterflow combustion air to be heated and flue gases to be discharged after being subjected to heat extraction, means supplying incoming combustion air to one such passageway, and means connecting another such passageway to an exhaust flue, said air paths discharging through nozzle means directed in an axial direction into said combustion chamber and projecting the said combustion air along the inside surface of the combustion chamber wall as an envelope surrounding the combustion flame, providing for the flame issuing from said fuel spray means to be of an elongated form and of relatively uniform temperature substantially throughout its length.

6. A heating apparatus comprising an elongated combustion chamber having a combustion chamber wall of thin heat transmitting material, a fuel burner at one end of said combustion chamber delivering a fuel spray in a conical pattern symmetrically of the longitudinal axis of said chamber, and an air delivery passageway isolated from said combustion chamber with an outlet means at the end of said combustion chamber opposite from said fuel burner, said air delivery passageway outlet means being of a configuration directing air in the form of an envelope flowing in an axial direction along the inside of said combustion chamber wall and counterflowing substantially concentrically around the flame issuing from said fuel burner to prevent direct impingement of the flame on said combustion wall and to produce by gradual mixing of such air envelope with the flame an elongated flame of relatively uniform temperature throughout its length, said apparatus further comprising a combustion chamber wall extension arranged at one end of said chamber, the said fuel burner being in the end portion of said combustion chamber opposite to the end having said extension, a combustion air preheater formed of a plurality of concentric spaced apart shells, the outer shell of which is said combustion wall extension, said shells forming shallow adjacent paths for counterflow combustion air being preheated and flue gases to be discharged after being subjected to heat extraction, said combustion air preheater discharging into said combustion chamber through said air delivery passageway outlet means, the said air delivery passageway means including spaced nozzle means dividing the air paths into multiple spaced apart streams to effect intermediate gaps between said multiple spaced apart streams, the combustion flue gases passing through the openings provided by the spaces between said nozzle means and in direct gaseous heat exchange relationship with the preheated combustion air entering the combustion chamber through said air delivery passageway outlet means.

7. A fuel-fired heater mechanism comprising an elongated combustion chamber defined laterally by a thin-walled heat transfer surface, a fuel burner means situated at one end of said chamber and arranged to deliver a fuel spray in a conical pattern symmetrically of the longitudinal axis of said chamber, and preheater means situated at the end of and away from said combustion chamber opposite from said burner means for delivering preheated combustion air to the flame in said chamber, such combustion air preheater means being arranged to essentially preheat said air by heat derived from the products of combustion discharged from said chamber and including means discharging the preheated air as an envelope along the inside of said combustion chamber wall, such envelope being delivered by said preheater means substantially concentrically of said combustion chamber and in counterflow, substantially parallel relation to the longitudinal axis of said flame so as to be further heated by the flame and so as to mix gradually with and elongate the flame, such axially disposed combustion air envelope providing efficient fuel combustion and substantially uniform flame temperature throughout the length of the flame while preventing overheating of any portion of said combustion chamber wall, yet permitting efficient heat transfer from the flame through said combustion chamber wall, the said means discharging the preheated combustion air into the combustion chamber comprising a series of spaced, axially directed nozzle means arranged in concentric pattern at the end of said combustion chamber just inwardly of said combustion chamber wall, radially considered, the products of combustion exhausting from the combustion chamber passing through slots between said nozzle means, providing symmetrical crossing of the streams of entering combustion air and the streams of exhausting products of combustion within the combustion chamber space in direct gaseous heat exchange relationship.

8. In a heating mechanism a heat source comprising an elongated combustion chamber having a combustion chamber wall of thin, heat transmitting material, a combustion wall extension arranged coaxially of said combustion chamber wall at one end thereof, and fuel spray means in the end portion of said combustion chamber opposite to the end having said extension; a combustion air preheater disposed in the said extension, which extension forms the outer shell of said preheater, said preheater being formed of a plurality of concentric spaced apart shells, the outer shell of which is said combustion wall extension, said shells being slidably mounted for independent thermal expansion with respect to each other and forming shallow adjacent and concentric paths for counterflow combustion air to be heated and flue gases to be discharged after being subjected to heat extraction, said air paths discharging through openings into said combustion chamber and projecting the preheated combustion air in an axial direction along the inside surface of the combustion chamber wall as an envelope surrounding and gradually mixing with the flame emerging from said fuel spray means so that such flame is of an elongated form and of relatively uniform temperature; and a flame failure and smoke detector means disposed in the stack end of the preheater, said concentric disposition of said preheater shells forming an open axial center extending from said flame failure means through the combustion chamber to the fuel spray means.

9. A fuel-fired heater mechanism comprising an elongated combustion chamber defined laterally by a thin walled heat transfer surface, fuel burner means situated at one end of said chamber and arranged to deliver a fuel spray in a conical pattern toward said surface and symmetrically of the longitudinal axis of said chamber, combustion products outlet means laterally offset around the axis of said chamber in concentric, annular pattern at the end of said combustion chamber opposite from said burner means, and combustion air inlet means also laterally offset around the axis of said chamber in concentric, annular pattern at the end of said combustion chamber opposite from said burner means, the said air inlet means delivering combustion air in direct gaseous heat exchange relation with the discharging combustion products and into the combustion chamber as an envelope flowing along the inner surface of the combustion chamber wall and in counterflow, surrounding relation to the fuel spray.

10. A fuel-fired heater mechanism comprising an elongated, combustion chamber defined laterally by a thin-walled heat transfer surface, combustion air inlet means situated at one end of said chamber and arranged in annular and laterally offset pattern to deliver combustion air into the chamber as an envelope in surrounding, counterflow relation to the flame in said chamber, fuel delivery means situated at the end of said combustion chamber opposite from said combustion air inlet means and arranged to spray fuel into said chamber in a conical pattern in counterflow relation to the combustion air, and combustion products outlet means positioned in annular pattern radially outwardly from said combustion air inlet means, the said combustion air inlet means comprising a series of spaced, nozzle means arranged in a concentric, annular pattern and directed toward said end of said chamber wherein is situated said fuel delivery means, and the said combustion products outlet means being located between said nozzle means, with symmetrical crossing of the combustion air streams and the streams of exhausting products of combustion within the combustion chamber space in direct gaseous heat exchange relation.

11. The method of uniformly heating a combustion chamber defined laterally by a thin wall heat transfer surface to provide efficient radiation of infrared energy outwardly of said surface by establishing and maintaining within said combustion chamber a stable flame of uniform temperature throughout its length, said method comprising: injecting fuel into the flame region from one end of the chamber in the form of a conical spray projecting outwardly toward the combustion chamber wall; delivering the combustion air into the chamber substantially parallel to the axis of said chamber and from the end thereof opposite the fuel spray so as to form an envelope against the chamber wall and in surrounding, counterflow relation to the flame and the fuel spray; maintaining the combustion chamber temperature in the region of the first mixing of incoming combustion air and fuel particles sufficiently high to support combustion so that combustion takes place whenever a fuel particle strikes an air particle, the inner face of said combustion air envelope adjacent the combustion chamber wall being the outer surface of the flame with combustion occurring along said inner face while said envelope is traveling towards the fuel spray end of said chamber, the said envelope of combustion air being partly gradually entrained by the flame and fuel particles as it approaches the fuel spray end of said chamber, with the unentrained portion of the combustion air at the fuel spray end of said chamber inwardly reversing direction to intimately and thoroughly mix with the fuel and flame centrally of the combustion chamber as it flows back through the chamber, and exhausting the products of combustion from said combustion chamber in an annular pattern and in counterflowing direct gaseous heat exchange relationship with the incoming combustion air.

12. The method of claim 11, further comprising regulating the amount of fuel and air delivered to said chamber so that the portion of the flame closely adjacent to the combustion air inlet contains a sufficient amount of unburned fuel particles to support combustion when supplied with combustion air, such regulation of the fuel and combustion air providing an elongated flame of uniform temperature throughout its length extending substantially the length of said combustion chamber and thus providing for maximum utilization of the combustion chamber for heat transfer in a compact furnace suructure.

13. The method of claim 11, further comprising preheating the incoming combustion air prior to the injection thereof into said combustion chamber by heat exchange with the products of combustion after discharge thereof from the combustion chamber.

14. The method of claim 11, further comprising exhausting the products of combustion from said combustion chamber in a plurality of discharge paths in annular pattern, and interlacing combustion air injection paths with such discharging products of combustion paths to provide direct, gaseous phase heat exchange therebetween.

References Cited in the file of this patent

UNITED STATES PATENTS

| | | |
|---|---|---|
| 767,614 | Warner | Aug. 16, 1904 |
| 2,692,763 | Holm | Oct. 26, 1954 |
| 2,716,330 | Way | Aug. 30, 1955 |
| 2,745,250 | Johnson et al. | May 15, 1956 |

FOREIGN PATENTS

| | | |
|---|---|---|
| 516,278 | Belgium | June 15, 1953 |